United States Patent
Dejneka et al.

(10) Patent No.: US 6,836,607 B2
(45) Date of Patent: Dec. 28, 2004

(54) CLADDING-PUMPED 3-LEVEL FIBER LASER/AMPLIFIER

(75) Inventors: Matthew J. Dejneka, Corning, NY (US); Adam J. Ellison, Corning, NY (US); Dmitri V. Kuksenkov, Painted Post, NY (US); John D. Minelly, Painted Post, NY (US); Carlton M. Truesdale, Corning, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 455 days.

(21) Appl. No.: 09/808,270

(22) Filed: Mar. 14, 2001

(65) Prior Publication Data

US 2002/0159736 A1 Oct. 31, 2002

(51) Int. Cl.[7] .................................................. G02B 6/02
(52) U.S. Cl. ...................... 385/126; 385/127; 385/146; 359/341.1; 359/341.3; 372/6
(58) Field of Search ............................... 385/122, 123, 385/124, 126, 127, 128, 142, 144, 146; 359/341.1–341.21, 341.31; 372/6

(56) References Cited

U.S. PATENT DOCUMENTS

| | | | | |
|---|---|---|---|---|
| 4,815,079 A | * | 3/1989 | Snitzer et al. ................. 372/6 |
| 5,309,452 A | * | 5/1994 | Ohishi et al. .................. 372/6 |
| 5,485,480 A | * | 1/1996 | Kleinerman .................... 372/6 |
| 5,530,710 A | * | 6/1996 | Grubb ........................... 372/6 |
| 5,710,786 A | | 1/1998 | Mackenchnie et al. ........ 372/6 |
| 5,949,941 A | * | 9/1999 | DiGiovanni .................. 385/127 |
| 5,973,824 A | * | 10/1999 | Sanghera et al. ........... 359/342 |
| 6,031,849 A | * | 2/2000 | Ball et al. ...................... 372/6 |

FOREIGN PATENT DOCUMENTS

| | | |
|---|---|---|
| EP | 0313209 B1 | 10/1992 |
| WO | WO 93/15536 | 8/1993 |

* cited by examiner

*Primary Examiner*—Toan Tran
*Assistant Examiner*—Michael H Caley
(74) *Attorney, Agent, or Firm*—Juliana Agon

(57) ABSTRACT

An optically active fiber (30) is disclosed for making a fiber laser (18) or an amplifier (16). This double-clad structured active fiber (30) has a core (34), doped with an optically excitable ion having a three-level transition. The core (34) has a core refractive index and a core cross-sectional area. An inner cladding (32) surrounds the core (34). The inner cladding (32) has an inner cladding refractive index less than the core refractive index, an inner cladding cross-sectional area between 2 and 25 times greater than that of the core cross-sectional area, and an aspect ratio greater than 1.5:1. An outer cladding (36) surrounds the inner cladding (32) and has an outer cladding refractive index less than the inner cladding refractive index.

28 Claims, 10 Drawing Sheets

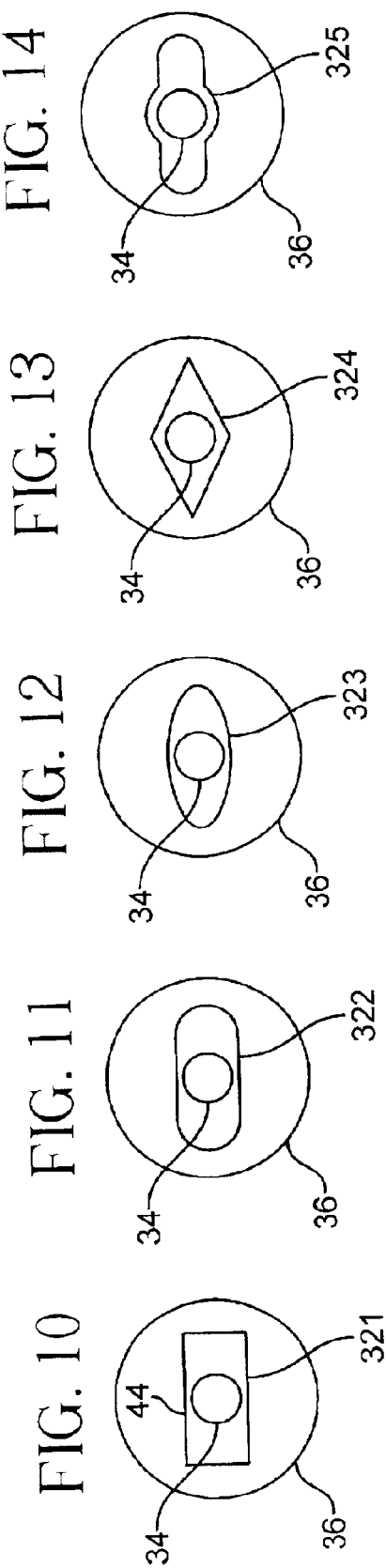

CLADDING-PUMPED 3-LEVEL FIBER LASER/AMPLIFIER

BACKGROUND OF THE INVENTION

1. Field of the Invention

The present invention relates generally to active fibers for use as optical amplifiers and lasers for applications ranging from laser-machining and graphic arts to telecommunications, and in particular to 3-level double-clad fiber lasers and 3-level double-clad fiber amplifiers.

2. Technical Background

Optical fiber is increasingly becoming the favored transmission medium for telecommunications due to its high capacity and immunity to electrical noise. Silica optical fiber is relatively inexpensive, and when fabricated as a single transverse mode fiber can transmit signals in the 1550 nm band for many kilometers without amplification or regeneration. However, a need still exists for optical amplification in many fiber networks, either because of the great transmission distances involved, or the optical signal being split into many paths.

As illustrated schematically in FIG. 1, a conventional amplifier 10 is interposed between an input transmission fiber 12 and an output transmission fiber 14. Erbium-doped fiber amplifiers (EDFAs) have been found quite effective in providing the required optical gain, as one example of the amplifier 10. Another example of the amplifier 10 is a fiber with Raman gain. Both transmission fibers 12, 14 need to be single-mode, because higher-order modes exhibit much greater dispersion (typically the limiting factor for the fiber transmission distance at high data rates). The EDFA 10 includes a length (on the order of tens of meters) of an erbium-doped silica fiber 16, as is well known in the art. It is well known that an erbium optical fiber amplifier operating in its purely three-level mode is capable, when pumped at a wavelength of 980 nanometers (nm) of amplifying optical signals having a wavelength of 1550 nm. The doped fiber 16 should also be single-mode in order to maintain the transmission signal integrity. The doped fiber 16 is optically active due to the presence of $Er^{3+}$ ions or other rare-earth metals, which can be excited to higher electronic energy levels when the doped fiber 16 is pumped by a strong optical pump signal. Typically, an optical pump source 18 inputs the pump signal into the doped fiber 16 through a pump source fiber 20 coupled to either the undoped upstream fiber 12 or the doped fiber 16 through a wavelength-selective directional coupler 22, but downstream coupling is also known. Again, for integrity of the transmission signal, the pump source fiber 20 should be single-mode. An operative EDFA may contain some additional elements (such as an isolator), which are well known to the art but not relevant to the understanding of the background of the present invention.

Conventionally, one typical pump source 18 has been an edge-emitting semiconductor laser that includes a waveguide structure (in what is called a "stripe" structure) that can be aligned with the single-mode pump source fiber 20 to provide effective power coupling. However, this approach has failed to keep up with modem fiber transmission systems incorporating wavelength-division multiplexing (WDM). In one approach to WDM, a number of independent lasers inject separately modulated optical carrier signals of slightly different wavelengths into the transmission fiber 12. The EDFA has sufficient bandwidth to amplify carrier signals within about a 40 nm bandwidth. A large number of multiplexed signals to be amplified require in aggregate a proportionately large amount of pump power. Over the past decade, the number of WDM channels preferably utilized in a standard network has increased from about four to current levels of forty or more, but at best the output power from a single-stripe laser source has only doubled. Derivative designs such as a master oscillator power amplifier (a single-mode stripe followed by a broad stripe amplifier) or flared-semiconductor devices are capable of producing more than one watt of optical output power, but many of these designs have been subject to reliability problems (such as back-facet damage caused by feedback) that have hindered their practical deployment as fiber amplifier pumps.

Another approach uses WDM technology to combine pump signals. Multiple single-stripe lasers are designed to emit light at narrowly spaced wavelengths, usually within the wavelength bands of 970–990 nm or 1460–1500 nm. Wavelength-dependent directional couplers combine these multiple optical waves into a single (somewhat broadband) pump signal. While this approach increases the power available for optical amplifiers, it greatly adds to the complexity of the pump source, and requires additional components such as thermoelectric coolers, fiber gratings, and directional couplers. As a result, this approach increases cost. At present, the most advanced amplifiers designed for dense wavelength-division multiplexing (DWDM) can use up to six ~150 mW single-mode diode laser pumps. Replacing these six pumps with one broad-area laser can greatly simplify the amplifier design and bring a significant cost advantage.

The single-stripe broad-area diode laser remains the most efficient and least expensive pump source. Recent progress in semiconductor laser technology has led to creation of a single-stripe broad-area laser diodes with output powers of up to 16 W. Devices 100 $\mu$m wide with a slow-axis numerical aperture (NA) of less than 0.1 and output power of 2 Watts at 920 and 980 nm are now passing qualification testing for telecommunication applications. With proper coupling optics, the beam of such a laser diode can be focused into a spot as small as 30×5 $\mu$m with an NA of less than 0.35 in both transverse directions. The optical power density in such a spot is ~1.3 $MW/cm^2$, which should be high enough to achieve transparency in 3-level laser systems.

One approach for utilizing inexpensive high-power broad-area pump lasers involves cladding-pumped, or double-clad fiber designs. The advantages of cladding-pumped fiber lasers and amplifiers are well known. Such a device effectively serves as a brightness converter, converting a significant part of the multi-mode pump light into a single-mode output at a longer wavelength.

Cladding pumping can be used in a fiber amplifier itself, or employed to build a separate high-power single mode fiber pump laser. A source based on the pure three-level 978 nm $Yb^{+3}$ transition has long been suggested as a pump for EDFAs because this wavelength is close to the desired pumping wavelength of 980 nm. However, the cladding-pumped technique has been determined in practice to be ineffective for pumping pure three-level fiber lasers, such as the 980 nm transition of ytterbium.

Practical double-clad amplifiers and lasers have been mostly limited to 4-level systems. Double-clad fiber lasers offer better performance for four-level lasing (where the lasing occurs in a transition between two excited states) than for three-level one (where the lasing transition is between the excited and the ground state). For example, for the rare-earth element Ytterbium (Yb) the three-level transition is at 978 nm and competing higher-gain four-level transition is at about 1030–1100 nm.

In a double-clad laser, an outer cladding confines the pump light from a primary pump source in a large cross-sectional area multi-mode inner cladding. The much smaller cross-sectional area core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030–1120 nm, respectively). Thus, conventional double-clad arrangements facilitate pumping of the fiber using a multi-mode first cladding for accepting and transferring pump energy to a core along the length of the device. Double-clad laser output can be used to pump a cascaded Raman laser to convert the wavelength to around 1480 nm, which is suitable for pumping erbium. To date, a double-clad design by itself (that is, without an additional Raman converter) does not produce a sufficiently high output in any of the appropriate absorption bands for EDFAs.

How much pump light can be coupled into a double-clad fiber inner cladding depends on the cladding size and NA. As is known, the "etendue" (numerical aperture multiplied by the aperture dimension or spot size) of the fiber should be equal to or greater than the etendue of the pump source for efficient coupling. The numerical aperture and spot size are different in both axes so there is an etendue in the x and y directions that must be maintained or exceeded.

Typically, a high numerical aperture $NA_{clad}$, related to the difference in refractive index between the first and second cladding, is desired. In the well-known design, the first clad layer is made of glass and the second is made of plastic (fluorinated polymer) with relatively low refractive index in order to increase the numerical aperture $NA_{clad}$. Such plastic may not have the desired thermal stability for many applications, may delaminate from the first cladding, and may be susceptible to moisture damage. Furthermore, the known large-cladding double clad concept is not efficient with three-level transitions, such as the 978 nm transition of ytterbium.

SUMMARY OF THE INVENTION

An optically active fiber is used for making a fiber laser or an amplifier. This double-clad structured active fiber has a core doped with an optically excitable ion having a three-level transition. The core has a core refractive index and a core cross-sectional area. An inner cladding surrounds the core. The inner cladding has an inner cladding refractive index less than the core refractive index, an inner cladding cross-sectional area between 2 and 25 times greater than that of the core cross-sectional area, and an aspect ratio greater than 1.5:1. An outer cladding surrounds the inner cladding and has an outer cladding refractive index less than the inner cladding refractive index.

The fiber laser or amplifier includes an optical fiber having a core doped with an ion such as erbium ($Er^{3+}$), neodymium ($Nd^{3+}$) or ytterbium ($Yb^{3+}$), which can be optically pumped.

The active fiber and a single-mode output fiber are both designed to provide equal mode field diameters for the lowest-order mode at the junction.

The inner cladding cross-section has an elongated shape with an aspect ratio matching that of the pumping diode laser.

The invention is particularly advantageous when used as a pump source for an erbium-doped fiber amplifier (EDFA) or for the EDFA itself, such as may be found in single-mode fiber optic communication systems or networks.

BRIEF DESCRIPTION OF THE DRAWINGS

FIG. 10 is a cross-sectional representation of a rectangular shape 321 of the inner cladding 32 of the active fiber 30 of FIG. 2, according to the present invention;

FIG. 11 is a cross-sectional representation of a racetrack shape 322 of the inner cladding 32 of the active fiber 30 of FIG. 2, according to the present invention;

FIG. 12 is a cross-sectional representation of a ellipsoid or elliptical shape 323 of the inner cladding 32 of the active fiber 30 of FIG. 2, according to the present invention;

FIG. 13 is a cross-sectional representation of a diamond shape 324 of the inner cladding 32 of the active fiber 30 of FIG. 2, according to the present invention;

FIG. 14 is a cross-sectional representation of a Saturn-like shape 325 of the inner cladding 32 of the active fiber 30 of FIG. 2, according to the present invention

DETAILED DESCRIPTION OF THE PREFERRED EMBODIMENTS

Figure 2:
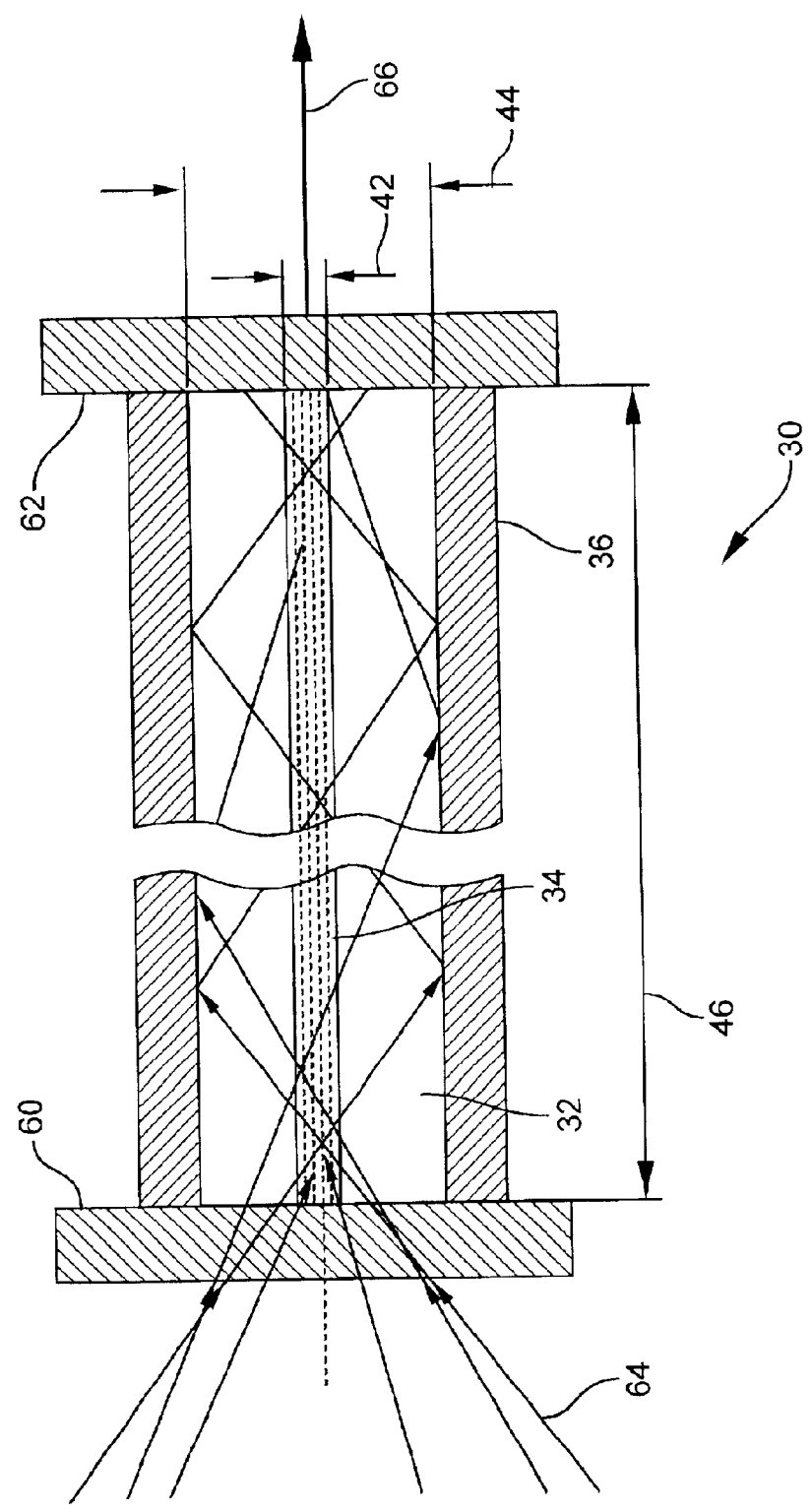
FIG. 2 is a schematic cross-sectional view of an optically active fiber according to the present invention.

The optically-active fiber, brightness converter, fiber amplifier, fiber laser, dielectric waveguide laser or amplifier of the present invention is shown in FIG. 2 and is generally described and depicted herein with reference to several exemplary or representative embodiments with the same numbers referenced to the same or functionally similar parts.

Even though the ineffectiveness of conventional cladding-pumped high power 980 nm fiber laser, which is a three-level fiber laser, was known, it was not known that it is possible to overcome this ineffectiveness using special design rules.

Figure 7:
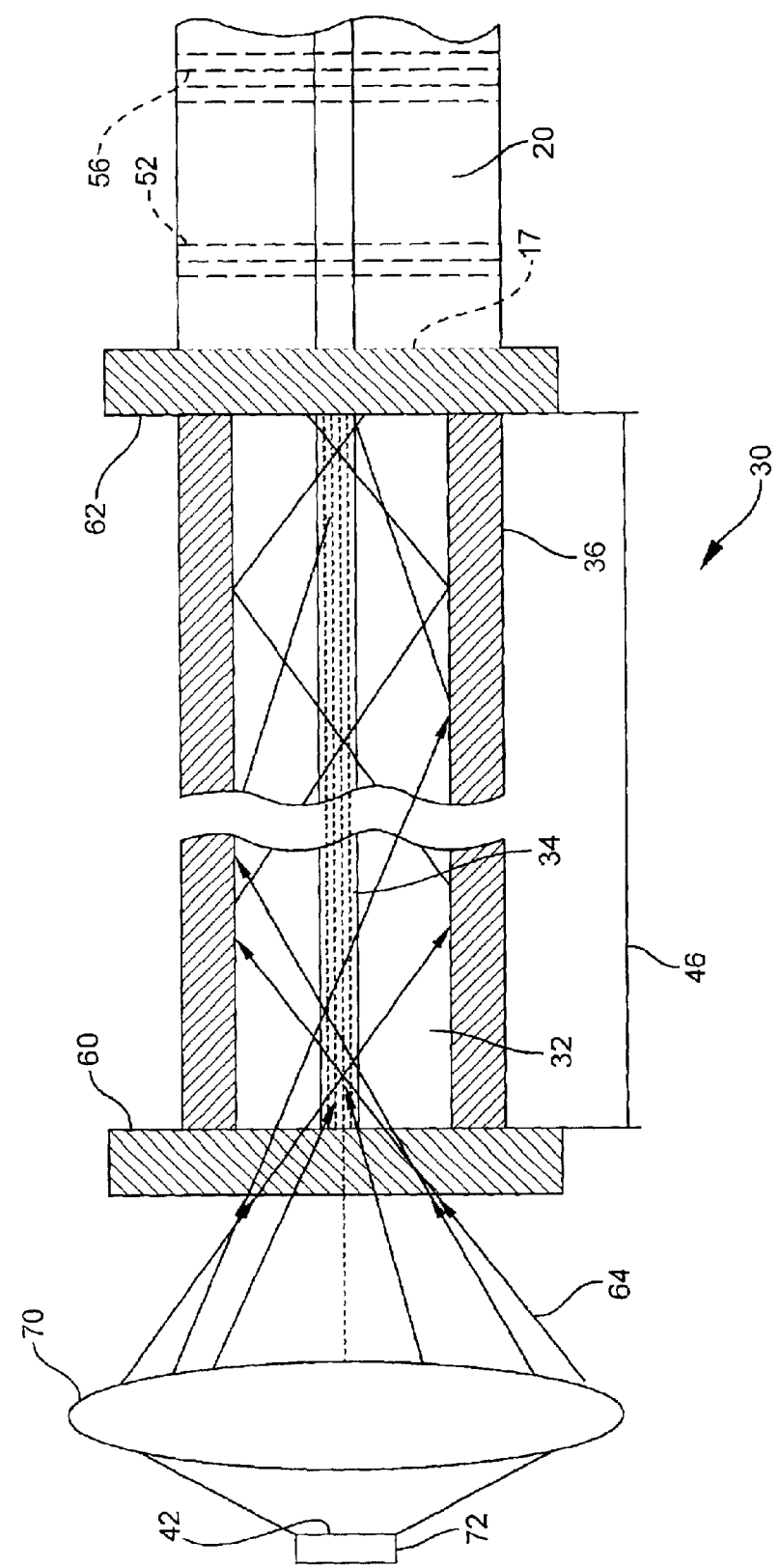
FIG. 7 is a schematic illustration of a pump source utilizing the active fiber 10 of FIG. 2, according to the present invention.

In general, a double-clad structure that could be used as a fiber laser or as an amplifier includes two claddings. A first (inner) multi-mode clad acts as a multi-mode pumping core. The first cladding or clad is adjacent to a single mode core, and a second clad surrounds the first clad. The first multi-mode clad or inner cladding serves as a waveguide with a high numerical aperture ($NA_{clad}$) for the input pumping light. The cross-section of the first multi-mode clad ($D_{clad}$ is the longer dimension 44 of the inner cladding as seen in FIG. 2) may be designed to have a desired shape, e.g., matched to the near field shape of the pump source ($D_{laser}$ is the size of the broad-area laser light emitting aperture 48 in a slow axis as seen in FIG. 7) or any other scheme or shape which increases coupling efficiency of the pump beam. The numerical aperture ($NA_{clad}$) between the first and second clad layers must be large enough to capture the output of the pump laser diode. The actual increase in brightness realized depends on the clad to core ratio (CCR) of the pump cladding area to the core area, with the higher the ratio (CCR), the greater the brightness increase. However, this disparity in area between the core and cladding cross-sections necessitates a long device length, since the absorption of the pump radiation is inversely proportional to this ratio (CCR). Conventionally high ratio (CCR) of pump cladding area to core area renders achieving a high level of inversion difficult, because in general the higher the ratio (CCR), the lower the level of inversion that can be achieved with a given pump power. Hence, pump absorption and inversion are related.

Using rare-earth elements, such as Er, Yb or Nd as the dopant in the core of the double-clad fiber amplifier/laser with high clad to core ratio (CCR) is thus problematic. Even with the very high power available from a diode laser bar, it is very difficult to reach the high level of inversion necessary for the operation of a 3-level system for lasers or amplifiers.

Three-level transitions require a high inversion of >50% in order to experience gain. Quasi-three-level transitions require lower, but significant inversion levels as compared to four-level lasers, which experience gain for infinitesimally small inversion. Ytterbium and neodymium ions ($Yb^{+3}$ and $Nd^{+3}$) provide a three-level lasing system at around 980 nm and a quasi-three-level lasing system at around 940 nm, respectively. In a three-level system, lasing occurs from an excited level to either the ground state or a state separated from it by no more than a few kT (that is, thermally mixed at operating temperature). As a result, an unpumped doped core strongly absorbs at the laser wavelength, and the lasing power threshold can become a problem because of insufficient population inversion.

In the competing and higher-gain four-level-transition case, for example, at about 1060 nm for neodymium (Nd), the doped core is still transparent at the laser signal wavelength when not being pumped. As a result, the power threshold for lasing depends essentially on the dimensions of the doped core and the inner cladding of a double-clad fiber structure, and the background loss in the double-clad fiber over the pump absorption length.

Likewise, even though $Yb^{3+}$ ions exhibit gain in a narrow 6 nm-wide pure three-level transition at 976–978 nm to show much promise of ytterbium as a pump for high-powered EDFAs, an efficient Yb 976 nm fiber laser has not been realized yet because of Yb's other competing and higher gain transition that peaks at about 1030 nm (but extends as far as 1120 nm), which is a broad quasi-four-level transition that requires a population inversion of only a few percent for transparency. Hence, the reason 980 nm (or close to 976 nm) lasing is difficult to achieve is because a high inversion level is required (>50%) for the 976 nm transition which means that the power laser threshold is also high. Furthermore, sufficient inversion is hard to achieve at about 976 nm because the competing quasi-four-level transition at about 1015–1030 nm for Yb produces the amplified spontaneous emission (ASE), which saturates the inversion.

The inversion problem stems from the relationship between the gains in the two competing transitions and the pump absorption for Yb. As a representative example, the gains at the two wavelengths in a Yb-doped germano-alumino-silicate glass (assuming homogeneous broadening) are related by the equation:

$$G_{1030} = 0.25 G_{976} + 0.74 \alpha_P \frac{\Gamma_S}{\Gamma_P} \quad (1)$$

where $G_{1030}$ and $G_{976}$ are the gains at 1030 nm and 976 nm, respectively, $\alpha_P$ is the partially-bleached pump absorption in decibels (dB), and $\Gamma_S$ and $\Gamma_P$ are the respective overlap factors of the signal mode and pump mode with the dopant profile.

Similar relationships with different coefficients will hold for other hosts, such as antimony silicate glass. As is known, double-clad fibers allow coupling from diode bars and other similar active structures. However, this is conventionally accomplished by a greatly-reduced pump overlap with the doping profile relative to the signal overlap, since the doping needs to be confined in or close to the signal core in order to obtain sufficient optical gain for the core mode at the signal wavelength. Typically, the core is uniformly doped, and the area ratio (CCR) between the pump waveguide and the signal core is on the order of 100:1 for conventional double-clad fiber lasers. As a result, $\Gamma_S=1$ and $\Gamma_P<0.01$. Using these values in Equation (1), each 1 dB of pump absorption produces about 20 dB of gain at 1030 nm. Similarly, for an overlap ratio of $\Gamma_S/\Gamma_P=50$, each dB of pump absorption would result in the gain at 1040 nm growing by as much as 36 dB.

Inevitably, the higher gain of competing transitions leads to a high level of amplified spontaneous emission (ASE), which saturates the inversion. Even with weak pumping, ASE at 1030 nm will saturate the amplifier and deplete or otherwise prevent a buildup of the population inversion necessary for lasing at 976 nm. In fact, even without an optical cavity, lasing at the longer four-level wavelength is possible from just the backscattering. Hence, high pump absorption will favor gain at 1030 nm or longer even if the laser mirrors, defining the cavity, are tailored to 976 nm.

Thus, in quasi-three-level or three-level cladding-pumped fiber lasers, poor overlap of the pump power spatial distribution with the doped area results in a much higher gain of competing four-level laser transitions that require relatively low inversion levels (<5%). It is therefore necessary to suppress the gain of these competing transitions in order to achieve the desired three-level or quasi-three level oscillation at the inversion level required.

Because making the fiber length long enough for a fixed pump power is equivalent to decreasing the average inversion, one prior approach intentionally made the fiber laser length short enough to avoid lasing at the quasi-four level transition at about 1030 nm but to preferentially lase instead at 980 nm. However, a short fiber laser is inefficient.

In accordance with the teachings of the present invention, in the specific case of an Yb 3-level transition at 980 nm, Equation (1) can be used to estimate the desired overlap ratio of $\Gamma_S$ and $\Gamma_P$ which is closely related to the area ratio (CCR) of the inner cladding area over the core area ($A_{clad}/A_{core}$). For Yb, given that an absorption of at least 6 dB of pump is desired, and the inability to suppress more than forty extra dB of gain at the competing quasi-four-level transition at 1030 nm, then using Equation (1), the desired $A_{clad}/A_{core}$ can be calculated. For the preferred silicate host glass the desired clad-to-core ratio ($A_{clad}/A_{core}$) is thus found to be less than eight for an Yb double-clad fiber laser.

Figure 1:
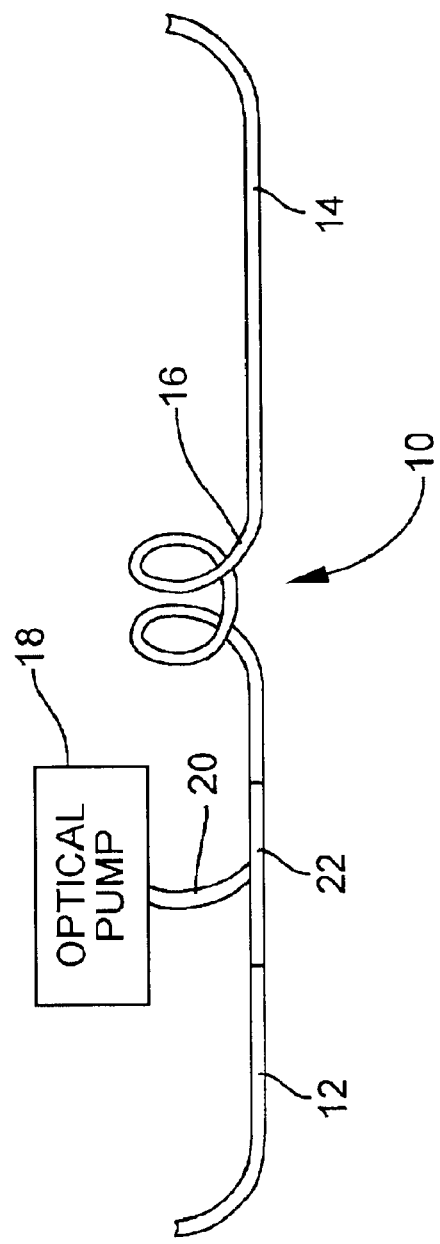
FIG. 1 is a schematic illustration of a prior art erbium-doped fiber amplifier (EDFA) used in a typical fiber optic telecommunications system.

Referring to FIG. 2, an optically active fiber 30 for making the fiber laser 18 or the amplifier 16 of FIG. 1 is illustrated. This double-clad structured active fiber 30 has a doped central part or core 34, doped with an optically excitable ion having a three-level transition or any other type of ion requiring a high level of inversion. The core 34 has a core refractive index ($n_{core}$) and a core cross-sectional area. The cross-sectional area can be calculated from the dimensions 42 of the core. An inner cladding 32 surrounds the core 34. The inner cladding 32 has an inner cladding refractive index ($n_{innerclad}$), less than the core refractive index, an inner cladding cross-sectional area between 2 and 25 times greater than that of the core cross-sectional area (2<CCR<25), and an aspect ratio greater than 1.5:1. This preferred design and dimensions of the double-clad active fiber 30, allows strong pump absorption, greater than 6 dB, while suppressing long wavelength ASE. The inner cladding cross-sectional area can be calculated from the dimensions of the inner cladding, which includes a longer dimension 44, as taught by the present invention and can be exemplified by FIG. 10.

Referring back to FIG. 2, an outer cladding 36 surrounds the inner cladding 32 and has an outer cladding refractive index less than the inner cladding refractive index.

As an example for use of the active fiber 30, the optically excitable ion having a three-level transition is Yb for making an Yb fiber laser 18 of FIG. 1. On the pumped end of the active fiber 30, a 100% signal reflective and pump transparent mirror 60 is placed. Signal reflection of about 4% is provided on the output end, with an optional output mirror 62. Neglecting waveguide loss, $g_{976}$=7 dB. It is desired to absorb at least 6 dB of pump power, but not more than 40 dB of 1040 nm gain can be suppressed by wavelength selective feedback. After substituting these values into Equation (1), the preferred clad-to-core area ratio or overlap ratio of $\Gamma_S/\Gamma_P$ can be found, and a maximum ratio of 7.6 is found and taught by the present invention for the rare-earth dopant Yb for use in an Yb fiber laser at 980 nm.

According to the teachings of the present invention, the optically excitable ion could be one or more of the transitional metals, such as chromium, in addition to being one of the rare-earth elements. If an element such as Ge, P, or B is used to provide Raman gain in a fiber, then the optically excitable ion is any suitable rare-earth element for use as a double-clad fiber laser for pumping the fiber with Raman gain.

In general, the active fiber 30 of FIG. 2 can be used as an amplifier or fiber laser. For all rare-earth dopants as the optically excitable ions, such as Er, Nd, Tm, and Yb, especially those requiring a high level of inversion, the present invention teaches a maximum allowable inner cladding area for the double-clad structure. Generally, given the pump absorption cross-section ($\sigma_{ap}$), the metastable level lifetime ($\tau$) and the desired level of average inversion ($\bar{n}_2$), and the available pump power from any type of a laser diode such that assuming a particular power absorption, input and output (unabsorbed) pump power values can be estimated as $P_{in}$ and $P_{out}$, respectively, the maximum permissible cross-sectional cladding area can be found using the following equation, as taught by the present invention for any rare-earth and host material system:

$$A_{clad} \leq \frac{\sigma_{ap}\tau(1 - \bar{n}_2(P_{in} - P_{out}))}{h\nu\bar{n}_2 \ln(P_{in}/P_{out})} \qquad (2)$$

where $h\nu$ is the pump photon energy.

Despite all the differences between ions and host materials, Equation (2) is universally applicable, and especially suited for amplifiers operating well below saturation. In the classical case of the active fiber 30 used as a conventional or C-band silica-glass Er-doped amplifier (EDFA) operating at 1530–1565 nm, $A_{clad}$<780 um² is taught by the present invention by substituting corresponding values in Equation (2). Hence, in general, it is not the clad-to-core ratio (CCR), but the absolute size of the inner cladding that is most critical for efficient laser or amplifier operation. Accordingly, the core 34 can be any size that fits inside the inner cladding 32 of FIG. 2.

However, it is preferable that the core 34 is similar in size and NA to standard single-mode fibers 20 and 14, which would facilitate coupling to the output fiber 20 for the laser or facilitate coupling to both the input and the output of the amplifier via the input fiber 12 and output fiber 14 of FIG. 1. With the typical single-mode core radius of 3 to 4 um, a clad-to-core area ratio CCR ($A_{clad}/A_{core}$) of 10:1 to 20:1 for the C-band Er case can be derived and taught by the present invention.

In this example, the double-clad fiber amplifier is based on silica glass codoped with Ge and Al (type II) and pumped at 980 nm ($\sigma_{ap}$=2.55×10⁻²⁵ m², $\tau$=8 ms, $h\nu$=2.03×10⁻¹⁹ J). A single 2 W laser diode is used to pump the amplifier. Given this 2 W available power of the laser diode, 80% of the available power ($P_{in}$=1600 mW) is coupled into the inner cladding. No more than half of that power escapes on the other end ($P_{out}$=800 mW) given the desired power efficiency of the fiber amplifier. For type II C-band amplifiers, an average inversion ($\bar{n}_2$) of –0.6 is needed to achieve a minimal gain "ripple" (gain variation within a useful amplification band). Substituting these values into Equation (2), the cross-sectional area of the inner cladding is found: $A_{clad}\approx 780\,\mu m^2$. What this means is that for an inner cladding cross-sectional area larger than 780 square microns, an average inversion of 0.6 will not be achievable unless a more powerful pump laser (more available power than 2 W) is used. In practice, passive losses will limit the useable size of the inner cladding to even lower values, of an order of 500 $\mu m^2$ or less.

Using a typical core radius of a=3 $\mu m$, the clad-to-core area ratio CCR is $A_{clad}/A_{core}$=500/($\pi \cdot 3^2$)≈18, which is well below values recommended in prior references or ever reported for working double-clad lasers and amplifiers.

Hence, for a C-band Er-doped double clad amplifier pumped with a 2 W 980 nm broad-area laser diode, recommended values, in accordance with the teachings of the present invention, for the clad-to-core area ratio are 10:1 to 20:1, but in any case, the cross-sectional area of the inner cladding should not exceed 500 $\mu m^2$. If the available power is doubled in the laser diode as in a 4 W pump diode, recommended values are then also doubled such that the clad-to-core area ratio range is now 20:1 to 40:1 and the inner cladding area is now less than 1000 $\mu m^2$.

For amplification in a long wavelength or L-band amplifier operating between 1570 nm and 1620 nm, significantly smaller values of the average inversion, such as around 0.4, are needed. Corresponding to a lower inversion, the maximum useable cross-sectional area of the inner cladding is at least 2.5 times larger than the case of a C-band amplifier. A double clad L-band amplifier pumped by a 1.76 W 980 nm laser diode module with the inner cladding cross-sectional area of 2100 $\mu m^2$ has been demonstrated. However, the amplifier efficiency was only ~15%, owing to its circular inner cladding geometry and its small pump absorption. Smaller inner cladding sizes are advantageous for L-band as well as for C-band amplification, since higher levels of pump absorption can be allowed for the same average inversion. Hence, for an L-band Er-doped double clad amplifier pumped with a 2 W broad-area laser diode, recommended values for clad-to-core area ratio CCR are 10:1 to 50:1 and the cross-sectional area of the inner cladding should not exceed 2000 $\mu m^2$.

With the small waveguide dimensions and preferred all-glass design taught by the present invention, conventional side-pumping approaches are not suited for this application. Although multi-mode coupler technology can still be used for amplifier pumping, it would typically result in a significant insertion loss. Thus, direct end pumping is the preferred choice.

Figure 3:
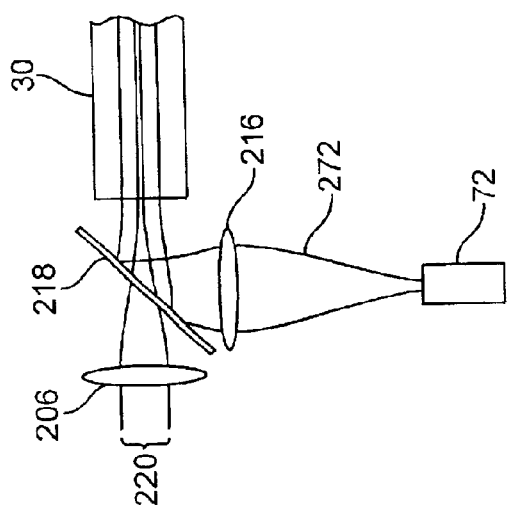
FIG. 3 is a schematic illustration of using the active fiber 30 as an amplifier, in a first embodiment, according to the present invention.

Referring to FIG. 3, a tilted micro-optic dielectric filter 218 multiplexes a pump light into the inner cladding and a signal into the core of the active fiber for making the amplifier. As one example of the tilted micro-optic dielectric filter 218, a beam combiner, such as a 45° oriented dichroic mirror is combined with micro-optics, such as a collimator 216 and other types of coupling optics 206, to combine the pump radiation 272 from a laser diode 72 and the signal radiation 220 at the input end of the active fiber 30 used as the fiber amplifier 16 of FIG. 1. The output end of the fiber amplifier can be spliced to the single mode fiber 14 of FIG. 1. If a counter-propagating pump or two-end pumping is desirable, the same micro-optics arrangement can be used on the output end. To maximize the output power, up to four separate broad-area diodes can be used to pump a double-clad laser or amplifier by polarization multiplexing two of them at each end.

Figure 4:
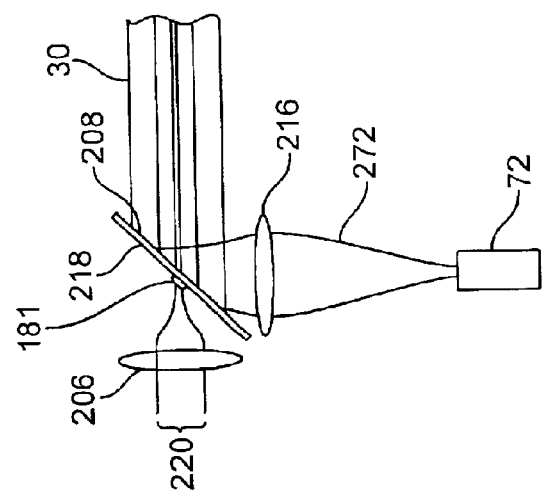
FIG. 4 is a schematic illustration of using the active fiber 30 as an amplifier, in a second embodiment, according to the present invention.
Figure 5:
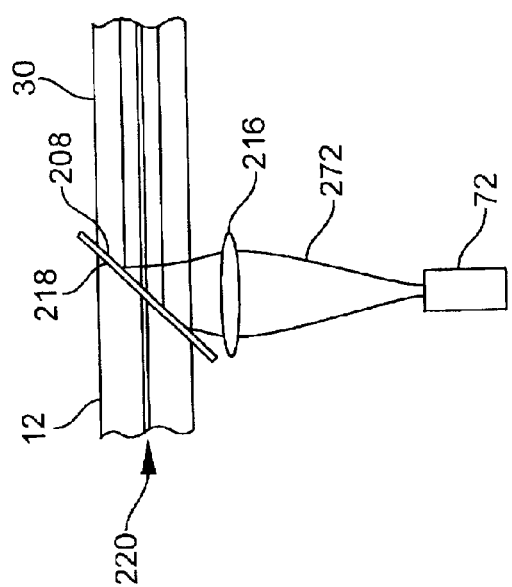
FIG. 5 is a schematic illustration of using the active fiber 30 as an amplifier, in a third embodiment, according to the present invention.

Referring to FIG. 4, to simplify the packaging of the combiner of FIG. 3, the dichroic mirror 218 is coated directly on a 45° polished end 208 of the double-clad active fiber 30. The pumping beam or radiation 272 is coupled from the side, with the micro-optics 216 and 206 adjusted for the presence of an additional microlens 181, such as a cylindrical lens formed by the fiber itself. Instead of using the microlens 181 and the coupling optics 206, if the thickness of the coated mirror 218 is sufficiently thin, the signal radiation 220 can be coupled directly into the fiber amplifier 30 through a mechanical joint 170 of FIG. 15 with the single-mode fiber 12 of FIG. 1 for better input coupling, as seen in FIG. 5.

Figure 15:
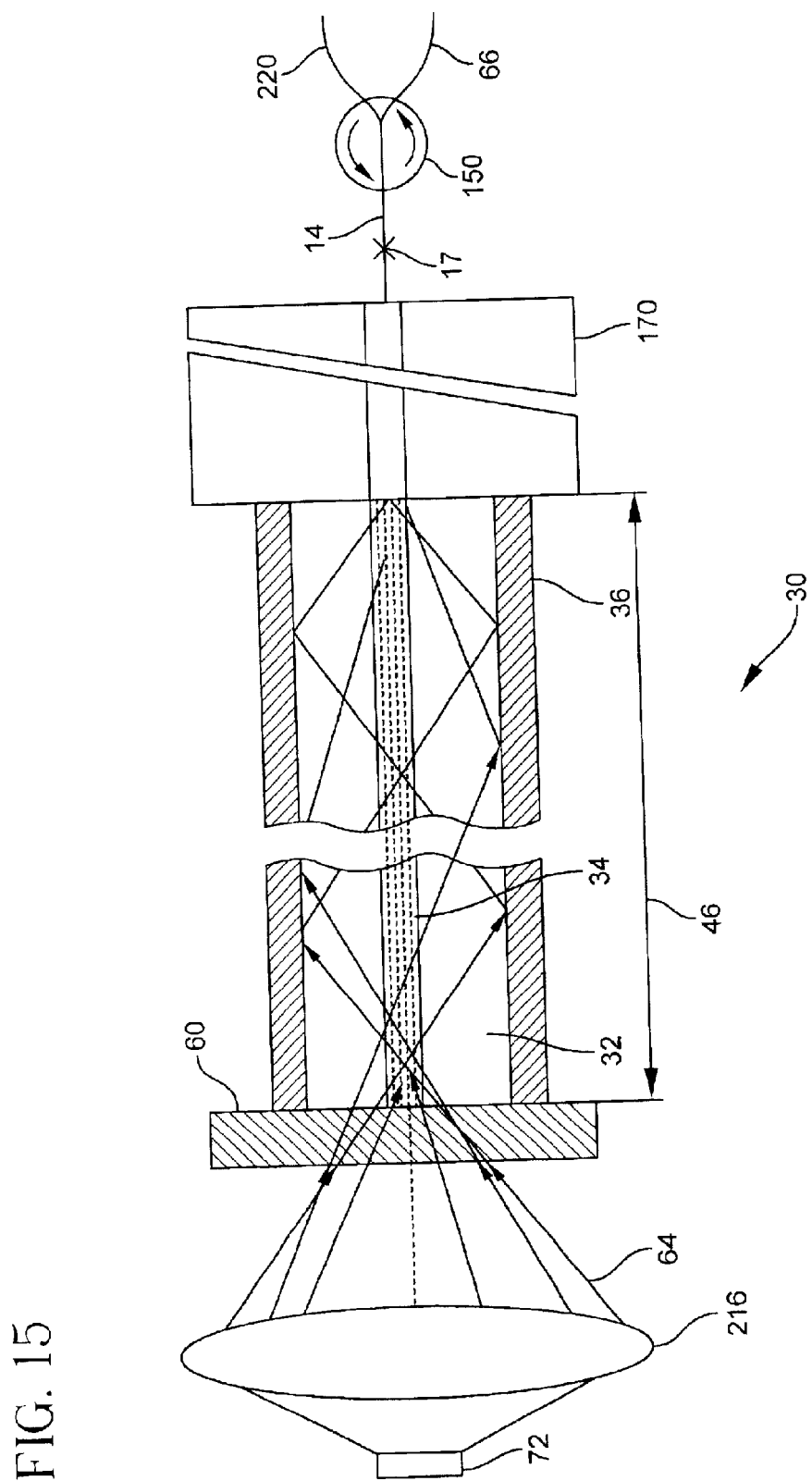
FIG. 15 is schematic illustration of using the active fiber 30 as an amplifier, in a fourth embodiment, according to the present invention.

Referring to FIG. 15, another approach is to use double-pass arrangement where the pumped end of the double-clad fiber amplifier is coated with a signal bandstop filter 60, such as a dielectric mirror, having high transmission for the pump wavelength and high reflection in the signal band. The signal is injected on the other end of the fiber amplifier and taken out by an optical circulator 150. To avoid splicing highly dissimilar fibers, the double-clad fiber amplifier can be mounted directly onto one of the circulator ports. Hence, the optically active fiber 30 of FIG. 2 is utilized in a double-pass geometry where a pump light is launched into the optically active fiber through the signal bandstop filter 60 and signals are launched at the opposite end of the optically active fiber 30 through a first port entering into a second port of the optical circulator 150, wherein the signal in the optically active fiber 30 experiences double-pass gain as a result of the population inversion created by the pump light and reflection by the signal bandstop filter 60 for providing signal extraction via a third port of the circulator for making the amplifier. The signal is thus experiencing double-pass gain in the active fiber. As is known, the circulator 150 is a component which separates forward and backward propagating light. Instead of a dielectric mirror, the signal bandstop filter 60 can also be a fiber grating.

The present invention teaches that what is important for 3-level devices, such as lasers or amplifiers, is the level of pump power density that can be created in the inner cladding, which defines the achievable inversion. In accordance with the teachings of the present invention to find the maximum desired area of the inner cladding, it is more convenient to use the power threshold estimate equation for a laser.

For any 3-level device the threshold pump power $P_{th}$ in a laser always has to be higher than the saturation power $P_{sat}$. In other words the fiber laser must be "bleached" (i.e., where approximately one-half lasing atoms have been excited into an excited state) along a substantial part of its length. $P_{sat}$ is the saturation power defined as $$P_{sat} = \frac{h\nu}{\sigma_{ap}\tau} A_{clad} \qquad (3)$$

Hence, the smaller the inner cladding area ($A_{clad}$) the lower is the saturation power $P_{sat}$ because these two terms are directly related by Equation (3). By substituting Equation (3) into Equation (2), it can be seen that the smaller the saturation power is, the greater the inversion because these terms are inversely related, hence the higher inversion can be achieved to make a 3-level laser work.

The threshold power $P_t$ scales in proportion to the cladding area ($A_{clad}$) and the length of the laser. The threshold pump power is well approximated by the following equation where it can be seen that the threshold pump power is higher than the saturation power by a factor $\alpha_p/4.343$ when the fiber laser is bleached:

$$P_{th} = P_{sat}(\alpha_p/4.343) = \frac{h\nu A_{clad}}{\sigma_{ap}\tau}(\alpha_p/4.343) \qquad (4)$$

where $\sigma_a$ is the pump absorption cross section, $\tau$ is the fluorescent or metastable level lifetime, $A_{clad}$ is the cross-sectional area of the inner cladding, and $\alpha_p$ is the pump absorption in dB. Hence, from Equation (4), the power threshold for lasing depends essentially on the dimensions of the inner cladding and the background loss in the active fiber over the pump absorption length.

Referring to FIG. 7, if the Yb fiber laser provided by the active fiber 30 is pumped with a single 2 W broad-area laser diode 72 and the input pump power $P_{in}$=600 mW is actually launched in the inner cladding 32, for the efficient laser operation the threshold power required for lasing should not exceed about a quarter of the input pump power, or 400 mW. Taking $\alpha_p$=6 dB, $h\nu$=2.16×10$^{-19}$ J (for a 920 nm pump), $\sigma$ap=8.3×10$^{-21}$ m$^2$, $\tau$=0.8 ms and $P_{th}$=0.4 W, the cladding area is taught by the present invention to be $A_{clad}$=890 $\mu m^2$ from Equation (4). Hence, for a Yb doped 976 nm double clad fiber laser pumped with a 920 nm broad-area laser diode, the recommended values for clad-to-core area ratio are 2:1 to 8:1 from Equation (1) and the cross-sectional area of the inner cladding should not exceed 900 $\mu m^2$ from Equation (4) because the threshold should be decreased as much as possible.

A double-clad fiber with such a small clad-to-core area ratio is realizable. For an 8 $\mu m$ diameter circular core within a preferred 10×30 $\mu m$ elliptical inner cladding, the area ratio is equal to $(5 \cdot 15/4^2) \approx 4.7$ which is less then the maximum taught ratio of 8 for Yb.

However, the practical size of the minimum area of the inner cladding will be limited by the choice of materials ($NA_{clad}$ and the index contrast or index delta) and the quality of pump focusing optics. With a cladding aspect ratio of 2 or higher it would be impossible to have a cladding to core area ratio CCR of less than 2, unless the core is elliptical too. Furthermore, with conventional optics it is very difficult to focus a 100 um broad area laser into a spot smaller than 20 um in size, and it is not practical to make a single-mode core larger than 10 um because the required index contrast or index delta will be too low. This, again, dictates that minimum CCR is about two.

Figure 17:
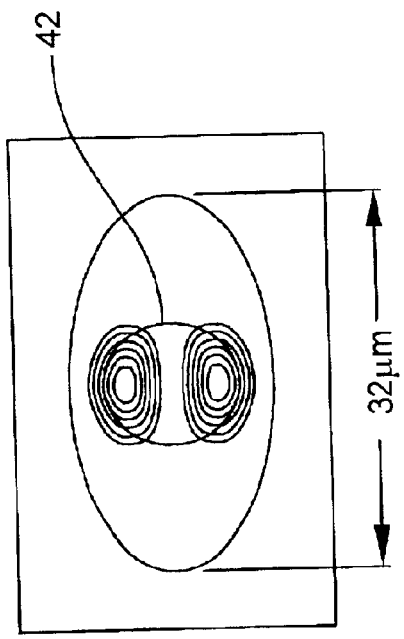
FIG. 17 is a modal representation of the overlap of the core 34 having a smaller core diameter 42 and inner cladding 32 of FIG. 12, according to the present invention.
Figure 16:
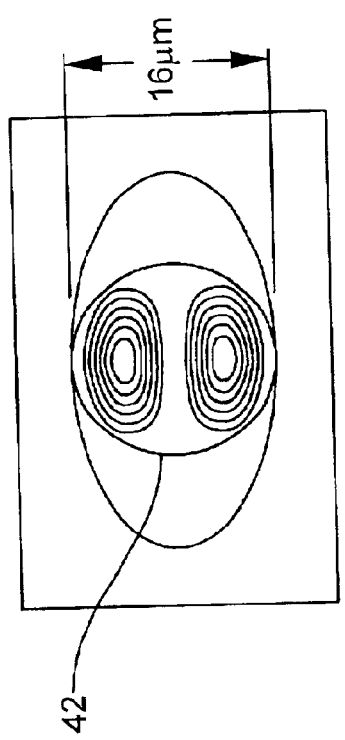
FIG. 16 is a modal representation of the overlap of the core 34 having a larger core diameter 42 and inner cladding 32 of FIG. 12, according to the present invention.

In a double-clad amplifier with a small clad-to-core area ratio (CCR), cladding modes of the signal will overlap with the doped core to a sufficient degree to experience gain in the higher-order modes (HOM). Any mode of the waveguide has a certain profile of the optical field, as seen in FIGS. 16–17. It is only amplified as much as that field overlaps with the doped region (for the description given here, we assume that only the core is doped, although partial doping of the cladding is also possible). Most of the field of the fundamental core mode is within the core 34, and that mode would obviously be amplified, if the required level of inversion were achieved. However, the inner cladding supports many different modes because of its larger size. Some ions will always transition spontaneously, giving equal amount of photons to every mode, core and cladding. If the cladding is comparable in size to the core, at least some of the higher-order inner cladding signal modes will have a sufficient overlap of their field with ions in the core to also be amplified, as seen in FIGS. 16–17. This will degrade the laser or amplifier efficiency, because optical energy accumulated in the higher-order cladding modes (ASE) will not be coupled to a single-mode output fiber.

A first solution to counter the cladding mode amplification effect is to increase attenuation of the inner cladding modes by doping the outer cladding with a suitable dopant that is an absorber, so that signal cladding modes are attenuated and never lase, but the core mode is not noticeably attenuated. Such a dopant should be strongly absorbing at the signal wavelength, but not absorbing at the pump wavelength to kill spontaneously excited (ASE) signal cladding modes. Amplifier efficiency will not be affected since core mode overlap with the outer cladding is small. Rare-earth elements such as $Sm^{3+}$, $Pr^{3+}$ or $Tm^{2+}$ are the preferred choices of the absorbing dopant 92 for Er amplifiers, as shown in FIG. 6.

Figure 6:
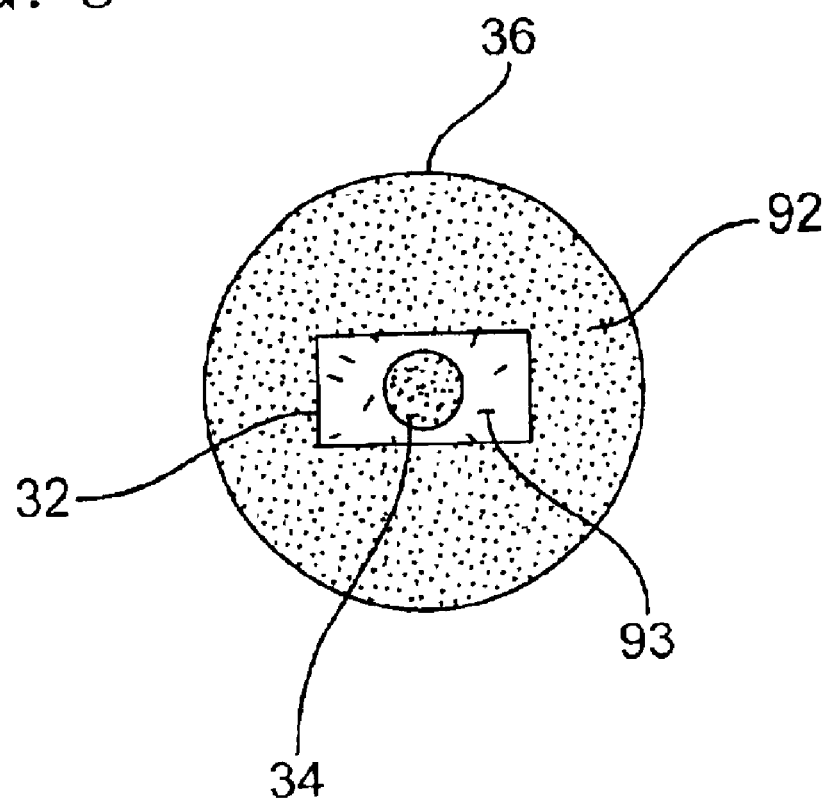
FIG. 6 is a cross-sectional view of the active fiber 30, having the outer cladding 36 and/or the inner cladding 32 of FIG. 2 doped, according to the present invention.

Alternatively, or in addition, the inner cladding 32 is doped with a signal absorbing dopant 93, as also seen in FIG. 6, to prevent amplification of the inner cladding higher order modes, where the absorbing dopant has a minimum overlap with the fundamental mode. In other words, a portion of the inner cladding 32, not overlapping with the fundamental mode, is doped with a signal absorbing dopant to prevent amplification of the inner cladding modes.

A second solution, for the amplifier, is to perfectly mode-match the input and output single-mode fibers 12 and 14 of FIG. 1 to the double-clad fiber core mode of the active fiber 30, used as the amplifier 16 of FIG. 1, so that very little light is launched into cladding modes of the amplifier. Otherwise, launching any light into the cladding modes of the amplifier would degrade it's efficiency because some pump energy would be wasted on amplification of the cladding modes and never converted into a useful output. To mode match the input fiber to the core mode of a double-clad fiber, when the fibers are spliced, it is taught to ensure that mode field diameter (MFD) is the same for the input fiber and the double-clad core. Even though actual index differences or index delta and core diameters may differ, what is needed is to match the MFD and align cores well. The third solution that the present invention teaches, for the laser, is to use mode-selective feedback to ensure a fundamental mode-only laser operation. To provide mode-selective feedback, as seen in FIG. 7, the output single-mode fiber is mode-matched to the double-clad fiber core mode and a signal reflector 52, in the form of Bragg gratings is provided in the output fiber, to ensure stronger optical feedback for only the core mode. If the internal loss is sufficiently small, then the laser efficiency is relatively insensitive to the external reflection. Therefore, a 4 to 15% external reflector will not significantly decrease the efficiency. However, once the reflector 52 is placed in the single-mode output fiber 20 and the fibers are mode-matched, only one mode, the core mode of the double-clad fiber laser 30, will receive the feedback, and the cladding modes will not. Hence, the reflector 52 reflects the signal light to perform a mode selection function. The presence of the reflector 52 and mode matching will ensure that cladding modes never lase (same purpose as doping the outer cladding for an amplifier, but only works here for a laser device, because an amplifier is not supposed to get any feedback). Alternatively, the output mirror 62, preferably in the form of a suitable thin-film stack, can take the place and eliminate the need for the Bragg reflector 52 and the pump reflector 56.

Since the present invention teaches that a high inversion level should be maintained throughout the whole length of a 3-level laser or an amplifier, a significant amount of pump power would pass through and escape on the other end. Therefore, for maximizing the laser/amplifier efficiency, it would be preferable to use an additional pump reflector 56 to reflect the residual power back into the device as seen in FIG. 7. A flat mirror, displaced by a small distance from the fiber end acting as a pump reflector, could also provide some mode-selective feedback for the signal, if it is designed to reflect 100% at the pump wavelength and 5–15% at the signal wavelength. Mode-matched coupling (splicing) 17 to a single mode fiber 20 with an additional fiber Bragg grating (FBG) acting as the pump reflector 56 can provide mode-selective feedback and also return back the portion of the pump light coupled to the output fiber 20. The mode-matched coupling 17 which could be in the form of a splice or a taper thus provides an intra-cavity transverse-mode-selective element that is coupled to the output of the optically active fiber for selecting the lowest transverse lasing mode.

In the case of a laser, the output flat mirror acting as the pump reflector 56 can simply be a dielectric mirror deposited on the cleaved or polished end of the fiber, transparent for the signal and highly reflective for the pump.

In the case of using the active fiber 30 as an amplifier 16 of FIG. 1, however, even a very small amount of signal reflection can cause undesirable multi-path interference effect. If a material of the inner cladding 32 is photosensitive, then an advantageous solution for the amplifier 16 is to write a multimode chirped fiber Bragg grating (FBG) 56 at the unpumped end of the active fiber 30, or in the output fiber 14 of FIG. 1 instead of the pump fiber 20 of FIG. 7, designed to reflect all or most of the pump modes.

In general, maximizing the overlap between pumping light and doped fiber core is advantageous. Thus it is desirable to make the core larger and inner cladding smaller. A larger core improves pump absorption and smaller inner cladding helps create higher inversion with less pump power. However, other factors already discussed and to be seen, limit the optimum core size to the one corresponding to a nearly two-moded core. The example easiest to follow is one using the Yb fiber laser at 980 nm. Due to physics, an area ratio (CCR) of not more than 5 or 6 is needed. Given the current material choice and capabilities of coupling optics, there is a limit to which the cladding size can be decreased before the pump coupling efficiency will start to suffer. Given that minimum cladding size, the only way to decrease the clad to core area ratio (CCR) below 5 or 6 is to start making the core larger and larger.

However, the index difference or delta between the core and the inner cladding cannot be made too small, or the optical field will simply not be confined in the core, as already discussed, and the core waveguide will have too much bend loss. Hence, with a given index difference or delta, one can only increase the core diameter 42 of FIG. 2 so much before the core becomes multimoded (up to about 10 um, in practice), unless the core is made with a graded index. It is known that for a given delta, a slightly larger core can still be single moded if the core has a graded index. In the case of an Yb fiber laser operating at 978 nm, the larger size graded index core lowers the gain for the unwanted 1040 nm line. In other cases, especially if the inner cladding waveguide has a noticeable amount of passive loss, a larger size graded index core allows it to absorb the same amount of pump power in a shorter fiber length, increasing the device efficiency. Grading of the core index profile can be achieved, for example, by annealing the core-inner cladding preform or drawing it at a higher temperature, allowing for significant dopant diffusion. When the core is molten and the cladding is softening, diffusional processes are relatively fast, so graded index profiles can be created in situ.

An ultimate version of the graded index is a core that grades down in index all the way to the edge of the outer cladding. Then, there is no defined border between the core and inner cladding, they become one. And still the 0-order or fundamental mode of such a waveguide is confined in its very center with a relatively small MFD, and the higher order modes fill the total waveguide area more uniformly. Hence, the present invention also teaches an analog of the area ratio (CCR) where it is the modal area ratio that is specified rather than the glass layers area ratio.

As discussed, many factors affect the optimum design of a double-clad fiber used as a waveguiding structure. A number of modes and their intensity (field) distribution within the waveguide depend on the waveguide shape, index contrast or index delta $\Delta$, and size.

For the case when a line between the core and the inner cladding (graded index) is hard to draw, the physical cross-sectional area ratio (CCR) is not simply defined. In this unique case of a high-delta graded waveguide used as both the core and the inner cladding of a "double-clad" fiber, the modal area is defined as the physical area where the optical intensity of the mode is higher than $1/e^2$ of its maximum (or electric field amplitude is higher than $1/e$ of its maximum). In other words, when the core and the inner cladding form a single waveguide made of a material with a continuously varying composition such that the refractive index is progressively decreased (graded) from a central part to an edge of the waveguide, the central part of the waveguide is doped with the optically active ion having the three-level transition to form a doped area, then the overlap between the fundamental (zero-order) signal mode of the waveguide with the doped area is preferably designed to not be more than seven times larger than the overlap of all pump modes of the waveguide combined with the doped area.

The direct analog for the physical cross-sectional area ratio (CCR) would then be the ratio of a/b where "a" is the cross-sectional area of all propagating pump modes combined and "b" is the cross-sectional area of the fundamental (zero-order) signal mode. All modes in this case are modes of the graded waveguide which is both the core and the inner cladding. However, the pump will use all of these modes and the signal ideally will propagate only in the zero-order one, giving the desired ratio of about 3:1 to 5:1 for a reasonably high delta. This 3:1 to 5:1 modal ratio of the cross-sectional area of all propagating pump modes combined over the cross-sectional area of the single signal mode is especially beneficial for the Yb 3-level laser.

A similar definition can be given for the standard case, when the core and the inner cladding have a clear border, because once again, the pump uses many modes of the cladding and the signal only uses one mode of the core. However, for the standard case this definition would give almost exactly the same numerical value as the physical cross-sectional ratio (CCR).

Optically, for conserving "etendue", the product of the $NA_{clad}$ and spot size of the double-clad fiber 30 has to be equal or greater than the product of the numerical aperture ($NA_{laser}$) and the spot size on the laser diode 72 of FIG. 7. If optics is used to de-magnify the image of the laser emitting area, the same optics will automatically make a beam more divergent, or increase its NA. The inner cladding (serving as a pump waveguide) NA, $NA_{clad}$ must then be equal or higher than that of the incoming beam, to collect all of the light. The general definition for the NA refers to the maximum divergence angle at which a light beam can enter a waveguide and still experience total internal reflection needed for waveguiding. For a typical 100 $\mu$m broad stripe laser, the divergence angle parallel to the stripe (slow axis) corresponds to an NA of approximately 0.1. A fiber NA greater than 0.35 is then desired for the efficient coupling of the pump light into a 30 $\mu$m core. For a 15 $\mu$m core, an NA of 0.7 is needed.

These NA values represent a very high refractive index contrast, or delta between the inner cladding and the outer cladding and are higher than available in standard silica fibers. However, they can be achieved with multi-component glasses. Tantalum silicate and lanthanum aluminum silicate fibers have been fabricated with a high refractive index relative to silica. Antimony silicate fibers using different compositions for the core and the inner cladding have also been fabricated with a high refractive index relative to silica. Almost any multi-component fiber will give a high refractive index, for example, those based on phosphates, lead silicates, and germanates, as the composites. However, the chemical and physical properties of the core must be compatible with the inner cladding, and spectroscopic properties of the dopant must be preserved. It is known that $Yb^{3+}$ and $Nd^{3+}$ can be doped into glasses other than silica and produce nearly the same transition levels.

Figure 9:
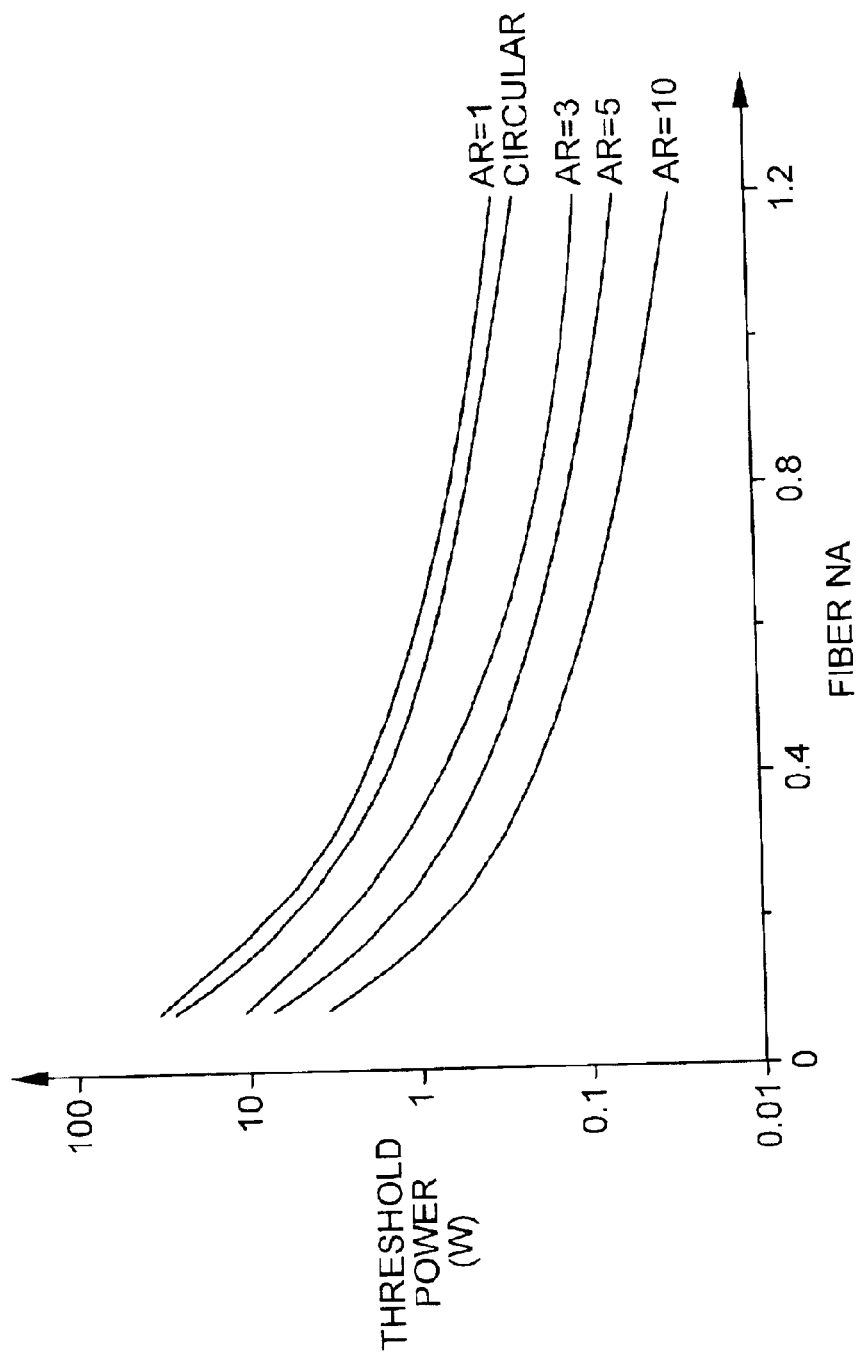
FIG. 9 is a graph of lasing threshold power for a number of active fiber 30 of FIG. 2 acting as waveguides having differing aspect ratios as a function of their numerical aperture (NA), according to the present invention.

The NA of the fiber waveguide also relates to the minimum size, and therefore, as shown above, to the threshold power value for a particular aspect ratio. The threshold powers for various waveguides have been calculated as a function of the numerical aperture (NA). In the example plotted in FIG. 9, the waveguide has a value of 20 μm for the product of the length of the major axis and the numerical aperture, for example, an NA of 0.2 and a major axis of length 100 μm. The top curve is calculated for a square inner cladding having a value of unity for the aspect ratio (AR) of the height to the width. The next lower curve is for a circular inner cladding. As the aspect ratio of the rectangular multi-mode inner cladding drops, the threshold power for lasing is significantly decreased. For rectangular aspect ratios of more than 4/π or 1.27, the rectangular inner cladding has a smaller threshold power for lasing than a circular one. For example, for a waveguide with a numerical aperture of 0.6, the threshold power for lasing is reduced from 900 mW for a circular inner cladding of a 33 μm diameter fiber to 200 mW for a rectangular inner cladding of the fiber waveguide having an aspect ratio of 3 (33 μm×11 μm). These dimensions are consistent with image sizes of broad stripe diode lasers. This reduction in threshold power for lasing is greatly advantageous if a 2 W diode is the limit of commonly available broad stripe pump sources.

As is known, for efficient coupling of the pump light, the inner cladding geometry of a double-clad fiber should match the geometry of the pumping diode. Unfortunately, the light emitting spot of a broad-area semiconductor laser is strongly asymmetric, with an aspect ratio of at least 100:1. The beam is typically single-moded (Gaussian) in the fast axis direction (perpendicular to the wafer plane) and strongly multi-moded in the slow axis direction (parallel to the wafer plane). The slow axis direction is the most critical one, ultimately defining the allowable size of the pump waveguide or fiber laser.

Referring to FIGS. 10–14, the present invention teaches a variety of elongated shapes that can be used for the inner cladding 32 of FIG. 2, the most technologically convenient ones being the rectangular inner cladding 321, the "racetrack" inner cladding 322 or the ellipse inner cladding 323. The longer (slow axis) dimension should be at least 10–20% larger than the width of the diode laser aperture ($D_{laser}$ 48 of FIG. 7) times the ratio of the diode slow axis $NA_{laser}$ to the fiber NA. For example, if a 100 μm laser with 0.1 NA is used for pumping and the fiber inner cladding NA is 0.3, then the longer dimension of that cladding should be at least 1.2·100/3=40 μm. To keep the cross-sectional area of the cladding as small as possible, the shorter (fast axis) cladding dimension should be made just large enough to accommodate the single mode core. Resulting aspect ratio of the cladding will then be 1.5:1 or higher. Oblong or an otherwise elongated shape of the inner cladding combined with the relatively small clad-to-core area ratio (CCR), will ensure uniform pump absorption by equalizing pump modes overlap with the doped core. Of the five shapes presented in FIGS. 10–14, including the diamond shaped inner cladding 324 not already mentioned, the "Saturn"—like inner cladding 325, having an elongated center elliptical extension in the middle of a just larger circle than the circle of the core, will have the smallest possible clad-to-core area ratio (CCR) for a given core size.

Referring back to FIG. 2, the preferred design and dimensions of the double-clad active fiber 30, allows strong pump absorption while suppressing long wavelength ASE and allows a strong enough pump intensity to obtain 3-level operation, summarizing the teachings of the present invention. An input side of a 3-level or a quasi-3-level double clad active fiber or brightness converter 30, for use as an amplifier or a laser, is irradiated with a pump signal 64 at wavelength $\lambda_p$. An inner cladding 32 is constructed for multi-mode operation. A preferably-single-transverse-mode core 34, centrally located within the inner cladding 32, is made from glass having a sufficient compositional difference from the inner cladding 32 to provide the appropriate differences in refractive indexes. The core 34 does not have to be strictly single mode, a core on the border of being 2-moded still works. Preferably for our stated purposes, the core 34 is doped with ytterbium ($Yb^{3+}$), erbium ($Er^{3+}$) or neodymium ($Nd^{3+}$) ions, but other rare-earth elements can be used. The double-clad active fiber 30 also includes an outer cladding 36 that is preferably made of a glass with a lower refractive index than the refractive index of the inner cladding 32 such that the $NA_{clad}$ is greater than 0.3. An all-glass design allows these types of refractive indexes and the glass types include lanthanum aluminosilicate glasses, antimony germanates, sulfides, lead bismuth gallates, etc. A preferred material for the overclad is also a glass, for example, an alkali of boroaluminosilicate.

No attempt has been made to accurately illustrate their relative diameters in the cross-sectional area representations of the active fiber 30 in FIGS. 10–14. However, the area of the inner cladding 32 is preferably approximately less than twenty-five times larger than the area of the core 34. Also, it is possible to use air (n=1) as the cladding.

The length of the active fiber 30 is relatively unimportant beyond its being very long compared to the wavelengths involved so that any higher-order modes are adequately attenuated over its length. In practice, this length is determined by the level of rare earth doping in the core and desired pump absorption efficiency. In some circumstances 1 cm in length is more than adequate.

The active fiber 30 includes two mirrors 60, 62 defining the input and output ends respectively of the optical cavity and to serve as end reflectors. The input mirror 60 is made highly transmissive to an optical pump signal 64 at the pump wavelength $\lambda_P$ and highly reflective at the signal (lasing) wavelength $\lambda_S$ of the output signal 66 while the output mirror 62 is made partially reflective (partially transmissive) at the signal wavelength $\lambda_S$ and preferably also at least partially reflective at the pump wavelength. For the active fiber 30 used as a fiber laser, it is possible to use a cleaved output facet as the output mirror. Even its 4% reflectance across an air gap to a butt coupled output fiber 20 of FIG. 1 is sufficient to define the optical cavity. A single-mode fiber 20 is butt coupled to the output end of the core 34. If the brightness converter or fiber laser 30 is being used as a pump source for an EDFA or other doped optical amplifier, such as a Raman amplifier or fiber with Raman gain, the single-mode fiber is the pump fiber 20 of FIG. 1. Thereby, the pump signal 64 is efficiently admitted into the optical cavity at the input mirror 60, an optical cavity is defined between the mirrors 60, 62, and some of the standing wave in the optical cavity is allowed to pass through the output mirror 62.

For the ytterbium fiber laser provided by the active fiber 30, the signal wavelength $\lambda_S$ equals 978 nm corresponding to the three-level $Yb^{3+}$ transition. Although the invention, where it concerns fiber lasers, is developed in view of $Yb^{3+}$ doping, it is not so limited. The fiber laser or brightness converter 30 may be doped with other transitional or rare-earth ions, such as $Nd^{3+}$. A combination of Yb and Nd doping, either by co-doping or by a sequence of differently doped fibers allows pumping at 800 nm rather than 920 nm.

Instead of using a separate focusing element 70, the optical characteristics of the broad stripe laser 72 may be good enough to allow direct coupling into the multi-mode inner cladding 32. However, if a focusing element 70 is needed, techniques have been developed that enable efficient coupling of pump power from broad-area laser diodes having typical emitting apertures with dimensions of 100×1 $\mu m^2$ and NA's of 0.1/0.55 in the slow and fast axes, respectively, into a fiber with a rectangular core cross section of 30×10 $\mu m^2$ and effective numerical aperture of >0.42. The terms "slow" and "fast" refer to the planes that are "parallel" and "perpendicular," respectively, to the laser diode junction plane. In order to efficiently couple light from the broad-area semiconductor laser 72 with emitter dimensions of 100×1 $\mu m^2$ and NA's of 0.1/0.55 in the slow and fast axes (measured at 5% of the maximum far-field intensity points), respectively, coupling optics or other beam shapers 70 can be designed to produce an image of the emitter near field with dimensions of 30×10 $\mu m^2$ and 5% NA's of 0.35/0.12 in the slow and fast axes, respectively.

Regardless of direct coupling or not, the pump signal may be provided by a laser diode 72 of FIG. 7, in the form of AlGaAs or InGaAs broad stripes, arrays, or a diode bar emitting at a wavelength shorter than 976 nm but within the ytterbium absorption band. The practical pump band extends from 850 to 970 nm with a more preferred range being 910–930 nm and a most preferred range being 915–920 nm. The precise values of these bands and the lasing wavelength may shift by a few nanometers depending upon the dielectric host.

As illustrated in the schematic view of FIG. 7 and FIGS. 10–14, the similar elliptical, rectangular, oblong, or otherwise elongated aspect ratios of the diode or broad-area laser 72 and of the input of the multi-mode cladding 32 (both vertically or horizontally aligned alike) allows a lens or fiber-optic coupler, optical exciter, or other beam shaper or focusing element 70 to focus the relatively large-size output of a wide stripe or "broad area" laser diode 72 or even a diode bar into the wide multi-mode cladding 32 of the fiber laser/amplifier or other types of brightness converter 30. Preferably, the inner cladding 32 has an aspect ratio greater than 1.5 and sized sufficiently small to allow the coupling of pump light from the broad-area laser diode 72 to create sufficient high pump power density. The inner cladding of the double-clad fiber can be drawn into elongated shapes, for example, ellipses or rectangles by various methods. Available methods include triple-crucible draw and the rod-in tube technique, with the parts machined into a desired shape. CVD, sol-gel, and soft glass in tube are other available methods.

The rectangular, elliptical, oblong, or other elongated cross section of the multi-mode cladding 32 of FIGS. 10–14 are particularly advantageous because its entrance face 323 can be more easily matched to the emission pattern of a wide stripe laser 72, which may have a width-to-height aspect ratio (AR) of 100:1. That is, the width of the waveguide entrance face 323 can be made substantially greater than its height, which is defined as a high aspect ratio. Even if the coupling optics is designed to form a beam which, when demagnified from the original 100×1 $\mu m$ size, has approximately equal NA in both orthogonal directions (advantageous for preserving a high power density), the resulting beam waist will still be substantially wider in the plane of the diode chip than it is in the vertical direction, for example, 30×5 $\mu m$. If the cladding waveguide cross-section matches that shape, then nearly all of the laser diode power can be easily coupled into the waveguide while maintaining a high optical pump power density. The high power density allows a lower power threshold for lasing than that available in circular or square waveguides. Other inner cladding cross-sections of other elongated shapes, for example, elliptical 132, "racetrack", diamond, "saturn", or any other beam-matching shape, can be used to match the shape of the pump emission area. However, it is desirable for the output of the fiber laser/amplifier or brightness converter 30 to have a substantially circular single-mode transverse field as its output from the core 34. It is desirable for the output of the fiber laser/amplifier 30 to have a substantially circular mode field because a conventional fiber 20 also has a circular mode field and the better the mode field size and shape match, the lower the coupling loss.

For any given NA of the inner cladding, the longer dimension of the double-clad fiber will be fixed by the requirements to couple all of the available pump power (since the size of a broad-area laser emitter is fixed and can be demagnified only by the amount defined by the fiber NA relative to the broad-area laser NA). The second or shorter dimension can then be varied. However, if the longer dimension is the same, an elongated shape with an aspect ratio of 3:1 will have a surface area 3 times less than the one with a 1:1 aspect ratio. Therefore, a corresponding laser with such a smaller surface or cladding area can have roughly 3 times lower threshold. Thus, while it is possible to build a 3 level laser/amplifier with a known D-shaped inner cladding, the inner cladding with an oval or otherwise elongated shape will provide a significantly lower threshold and therefore higher efficiency. A lot of factors in designing an optimum 3-level double-clad fiber laser or amplifier relate back to the cladding to core area ratio (CCR). With a given fiber NA and pump laser NA, one of the dimensions of the inner cladding can not be decreased below certain size. But to decrease the surface area as much as possible for higher inversion, in accordance with the teachings of the present invention, the other dimension can be squeezed. Thus, the present invention teaches that neither the area nor an aspect ratio specification by itself is sufficient for building an efficient device and only complying with both specifications at the same time can provide sufficient inversion and low threshold.

As well as for a laser, the active fiber 30 used as an amplifier utilizes the multi-mode inner cladding to receive the pump light 64 for coupling to the core which provides most of the optical amplification. The single-mode fiber output fiber is butt coupled at an output junction of the active fiber 30, for example by a splice or other connection, and effectively outputs a lasing signal 66 that is only the fundamental mode. Preferably, the mode field diameters (MFD) for the respective lowest-order modes are matched across the junction between the output end of the active fiber 30 and the single-mode fiber. If not index-graded, the core is sized sufficiently small such that the core supports only one transverse mode at the output signal wavelength such that this single transverse mode has a mode field diameter equal to that of a standard single mode fiber for optimum coupling.

As an example, a 30×10 micron (or $\mu m$) rectangular inner cladding 32 of a multi-component silicate glass is placed within an outer cladding 36 having a diameter of 125 micron and has a core 34 having a core diameter 42 of 6 micron, to provide an output mode closely matched to a CS980 single-mode fiber 20. Preferably an antimony sillicate glass is used. Another multi-component silicate glass is $60SiO_2 28Al_2O_3 12La_2O_3$ (in mole %). Even though other single-mode fibers are usable, the single-mode fiber 20 is the CS980 single-mode fiber made by Corning, Inc. for propagating wavelengths at 980 nm and having a standard 125 micron outer diameter.

Minimizing the mismatch of the coefficient of the temperature expansion (CTE) is very important for increasing fiber reliability and to facilitate the cleaving and end-polishing of the fibers. A less than $+/-30 \times 10^{-7}/°$ C. over the range 0–200° C. CTE mismatch is preferred between the inner cladding and outer cladding. The most important point of mismatch is between the inner and the outer clad, though the core to clad CTE mismatch could be important for polishing. Hence, the core is preferably also made from a glass having a coefficient of thermal expansion (CTE) mismatch with the material of the inner cladding of less than +/−30×10⁻⁷/° C. over the range 0–200° C. These requirements are relatively easily met using antimony silicates, alumino-lantano-silicates, alumino-phospho-germanosilicates and a variety of other oxide glasses. For some fiber-making techniques, such as triple-crucible draw, it is also important to match the viscosities of the core, inner and outer cladding glasses for better control over a waveguide shape.

EXAMPLE

The invention will be further clarified by the following example which is intended to be exemplary of the invention, as generally depicted in FIG. 2 and FIG. 7.

Example 1

An efficient all-glass Yb-doped double-clad fiber laser 30 that delivers over 1 W of single-transverse-mode output at 978 nm when pumped with 2.5 W of launched power from a 200 μm broad-area laser diode at 915 nm has an all-glass design. This double-clad fiber laser has a small clad-to-core ratio (CCR), combined with strong spectral and modal gain discrimination. The fiber core 34 and the first or inner cladding base glass 32 is a multi-component antimony-silicate. The step-index core 34 has a numerical aperture of 0.1 relative to the first cladding ($NA_{core}$) The inner cladding 32, in turn has en effective numerical aperture of 0.5 ($NA_{clad}$) relative to the boro-silicate glass second or outer cladding 36. The core 34 is uniformly doped with 0.45 wt % Yb having a fluorescence decay time of 875 μs. The absorption and fluorescence spectra of the active fiber 30 produced using the triple-crucible method show that the quasi-four-level emission peaks at 1015 nm whereas the absorption has a broad shoulder from 910 to 950 nm.

The unwanted lasing at 1015 nm needs to be eliminated. Spectrally selective thin film multi-layer dielectric mirrors 60 and 62 are used to provide increased loss and fiber 46 length control is used to limit available gain for the 1015 nm line. The necessary excess loss at 1015 nm increases with increasing pump absorption and CCR. With 10 dB of double-pass pump absorption at 915 nm and 13 dB of threshold gain at 978nm, the required double-pass loss at 1015 nm is at least 22–30 dB when the CCR is 4–5. This level of transmission loss, together with input mirror 60 requirements of high reflection/transmission at 978/915 nm is about the best that can be done with current thin film technology.

For modal gain discrimination, the shape and dimensions of the fiber first or inner cladding 32 are chosen from considerations involving maximization of pump power coupling efficiency using anamorphic optics. A 200×1 μm² broad-area laser diode 72 near field with NA's of 0.1/0.65 in planes parallel/perpendicular to the junction was transformed to a nominally 30×10 μm² spot and coupled with 75% efficiency into the double-clad active fiber 30 with an ellipsoidal first cladding cross section 323 of FIG. 12 having major and minor axes dimensions of 32×16 μm². Hence, with an upper bound of 4–5 for the CCR, the core diameter 42 can not be smaller than 10–11 μm unless the mirror loss at 1015 nm is increased beyond the 22–30 dB range. For every micron reduction in diameter, approximately 8 dB of 1015 nm extra loss is required.

On the other hand, a larger core increases the gain of higher-order modes (HOM) of a compound clad-core structure, which can readily lase, hindering diffraction-limited performance. According to the teachings of the present invention, the core cross-sectional area is dimensioned such that the higher-order modes of the inner cladding experience a lower overlap with the doped area than the fundamental mode, as seen in and preferably dimensioned in FIG. 17. This point is illustrated in the comparison of FIGS. 16–17, where the highest-gain HOM of the compound clad-core structure is computed for a core diameter 42 of D=16 μm (CCR=2) in FIG. 16 and D=10 μm (CCR=5) in FIG. 17. The overlap factors of these modes with the doped area, which determine the effective modal gains, are Γ=96% and Γ=65%, respectively. For comparison, the respective fundamental modes have Γ=97% and 85%. As the core size increases, the Γ factor of HOM's increases, approaching the value for the fundamental mode, leading to reduced differential modal gain discrimination. Therefore, a 32×16 μm² inner cladding double-clad fiber was designed with an 11 μm diameter core, which had an estimated near-threshold gain discrimination of approximately 3 dB between the fundamental mode and highest gain HOM.

Figure 8:
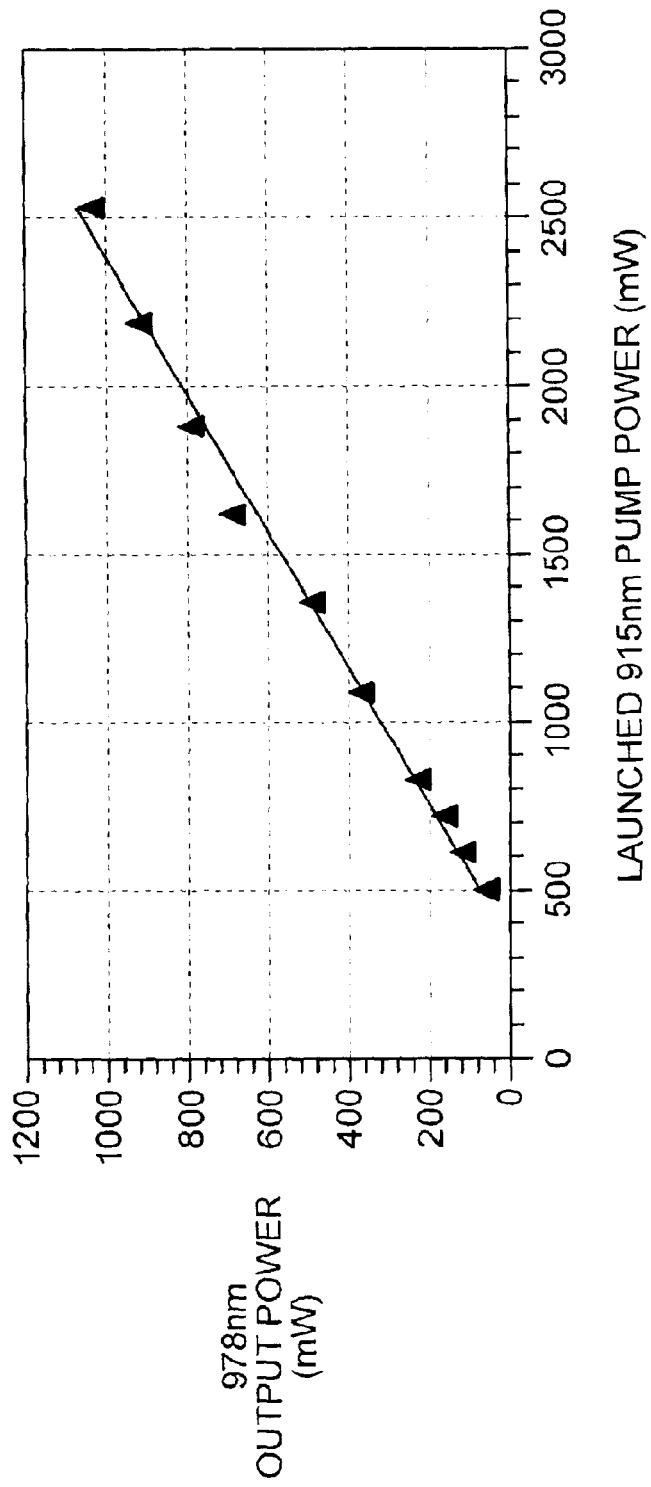
FIG. 8 is a graph of output power (milliwatts) at 978 nm versus input power (milliwatts) at 915 nm, according to the present invention.

As shown in FIG. 8, over 1 W of output power was obtained with 2.5 W of pump launched. About 10 dB of double-pass pump absorption over a fiber length 46 of 30 cm was achieved with a thin-film dielectric pump reflector 56. With respect to the launched pump power, the threshold was about 330 mW and slope efficiency was 48%. The Gaussian near field of the fiber laser output had a MFD of 10 μm and the far field M² was 1.1. The output was coupled to single-mode CS980 fiber 20 with 80% efficiency, further evidence of the diffraction-limited emission of the device.

It will be apparent to those skilled in the art that various modifications and variations to the options and design criteria of the double-clad structure, such as the lens, coupling scheme, fiber laser, amplifier, and other components of the optical package can be made to the present invention without departing from the spirit and scope of the invention. Thus, it is intended that the present invention covers the modifications and variations of this invention provided they come within the scope of the appended claims and their equivalents.

What is claimed is:

1. An optically active fiber for making a fiber laser or an amplifier, comprising:
   a core, doped with an optically excitable ion having a three-level transition, the core having a core refractive index and a core cross-sectional area;
   an inner cladding, surrounding the core, the inner cladding having an inner cladding refractive index less than the core refractive index, the inner cladding having an inner cladding cross-sectional area between 2 and 25 times greater than that of the core cross-sectional area, and the inner cladding having an aspect ratio greater than 1.5:1; and
   an outer cladding surrounding the inner cladding, the outer cladding having an outer cladding refractive index less than the inner cladding refractive index.

2. The optically active fiber of claim 1, wherein the core is sized sufficiently small such that the core supports only one transverse mode at the output signal wavelength, and the only one transverse mode has a mode field diameter equal to that of a standard single mode fiber for optimum coupling.

3. The optically active fiber of claim 1, wherein the core is doped with the optically excitable Yb ion having the three-level transition at about 980 nm, the inner cladding having the inner cladding cross-sectional area between 2 and 8 times greater than that of the core cross-sectional area.

4. The optically active fiber of claim 1, wherein the optically excitable ion requires a certain level of average inversion $n_{2(bar)}$ for optical amplifier or laser operation at the three-level transition, the inner cladding cross-sectional area is less than $$A_{clad} \leq \frac{\sigma_{ap}\tau(1 - \bar{n}_2(P_{in} - P_{out}))}{h\nu\bar{n}_2\ln(P_{in}/P_{out})},$$

where $\sigma_{ap}$ is the pump absorption cross-section for the host material of the core, hv is the pump photon energy, ($\tau$) is the metastable level lifetime, $P_{in}$ is the available pump power and $P_{out}$ is the amount of that pump power permitted to be not absorbed.

5. The optically active fiber of claim 4, further comprising an intra-cavity transverse-mode-selective element coupled to the output of the optically active fiber for selecting the lowest transverse lasing mode.

6. The optically active fiber of claim 1, wherein the core and the inner cladding are made from different compositions of antimony-silicate glass.

7. The optically active fiber of claim 1, wherein the difference between the outer cladding refractive index and the inner cladding refractive index is large enough to ensure that the inner cladding numerical aperture NAclad satisfies the condition $NA_{clad} > NA_{laser} * D_{laser}/D_{clad}$, where $NA_{laser}$ is the numerical aperture of a broad-area pump laser in a slow axis, $D_{laser}$ is the size of the broad-area laser light emitting aperture in a slow axis and $D_{clad}$ is the longer dimension of the inner cladding.

8. The optically active fiber of claim 1, wherein the difference between the outer cladding refractive index and the inner cladding refractive index is large enough to provide a numerical aperture (NA) greater than 0.3.

9. The optically active fiber of claim 1, wherein the inner cladding is made from a glass having a coefficient of thermal expansion (CTE) mismatch with the material of the outer cladding of less than $+/-30 \times 10^{-7}/°$ C. over the range 0–200° C.

10. The optically active fiber of claim 9, wherein the core is made from a glass having a coefficient of thermal expansion (CTE) mismatch with the material of the inner cladding of less than $+/-30 \times 10^{-7}/°$ C. over the range 0–200° C.

11. The optically active fiber of claim 1, wherein the optically active fiber is utilized in a double-pass geometry where a pump light is launched into the optically active fiber through a signal bandstop filter and signals are launched at the opposite end of the optically active fiber through a first port entering into a second port of an optical circulator, wherein the optically active fiber experiences double-pass gain as a result of the population inversion created by the pump light and reflection by the signal bandstop filter for providing signal extraction via a third port of the circulator for making the amplifier.

12. The optically active fiber of claim 1 further comprising a tilted micro-optic dielectric filter for multiplexing a pump light into the inner cladding and a signal into the core of the active fiber for making the amplifier.

13. The optically active fiber of claim 1, wherein the core has a graded index.

14. The optically active fiber of claim 1, wherein the outer cladding is doped with a signal absorbing dopant to prevent amplification of the inner cladding modes.

15. The optically active fiber of claim 1 wherein the optically excitable ion is Er producing a three-level amplification for making a C-band Er amplifier, the inner cladding cross-sectional area is less than 780 $\mu m^2$.

16. The optically active fiber of claim 1 wherein the inner cladding has a generally rectangular cross-section.

17. The optically active fiber of claim 1 wherein the inner cladding has a generally elliptical cross-section.

18. The optically active fiber of claim 1 wherein the inner cladding has a generally elongated cross-section.

19. The optically active fiber of claim 1 wherein the inner cladding has a generally "Saturn"-like shape.

20. The optically active fiber of claim 1 further comprising a pump reflector coupled to or inscribed in the optically active fiber.

21. The optically active fiber of claim 1, further comprising at least one dielectric mirror deposited on a cleaved or polished end of the core.

22. The optically active fiber of claim 1, wherein the core and the inner cladding form a single waveguide made of a material with a continuously varying composition such that the refractive index is progressively decreased from a central part to an edge of the waveguide, the central part of the waveguide is doped with the optically active ion having the three-level transition to form a doped area, and the overlap between the fundamental signal mode of the waveguide with the doped area is not more than seven times larger than the overlap of all pump modes of the waveguide combined with the doped area.

23. The optically active fiber of claim 1, wherein the optically excitable ion is Yb for use as an Yb double-clad fiber laser for pumping an Er-doped fiber amplifier (EDFA).

24. The optically active fiber of claim 1, wherein the optically excitable ion is a rare-earth element for use as a double-clad fiber laser for pumping a fiber with Raman gain.

25. The optically active fiber of claim 1, wherein the inner cladding is doped with a signal absorbing dopant to prevent amplification of the inner cladding higher order modes, where the absorbing dopant has a minimum overlap with the fundamental mode.

26. The optically active fiber of claim 1, wherein the core cross-sectional area is dimensioned such that the higher-order modes of the inner cladding experience a lower overlap with the doped area than the fundamental mode.

27. A fiber laser comprising:
  a broad-area laser diode having a pump light having an output power of at least 1 Watt;
  a double-clad optically active fiber having a first end for receiving the pump light and a second end for outputting a laser signal, the double-clad optically active fiber including
    a core for supporting close to a single-mode transmission of the laser signal, the core having a cross-sectional core area, the core doped with a plurality of optically excitable dopants having a transition requiring a high level of inversion at a desired signal wavelength of the laser signal;
    an inner cladding disposed adjacent to the core having an aspect ratio greater than 1.5 and configured sufficiently small to match a laser mode field geometry of the pump light to allow the inner cladding to optically deliver the pump light to the core at a high pump power density, the inner cladding having a cross-sectional area approximately 2 to 25 times larger than the core area to allow a sufficiently high overlap between dopants in the core and the pump light, such that the high pump power density and the high overlap between dopants and the pump light provide the required level of inversion for lasing with a low power threshold and high efficiency; and an outer cladding disposed adjacent to the inner cladding having an index of refraction less than the inner cladding for confining the pump light.

28. A fiber amplifier comprising:

a broad-area laser diode having a pump light having an output power of at least 1 Watt;

a double-clad optically active fiber including a core for supporting close to a single-mode transmission of the amplified signal, the core having a cross-sectional core area, the core doped with a plurality of optically excitable dopants having a transition requiring a high level of inversion at a desired signal wavelength of the amplified signal;

an inner cladding disposed adjacent to the core having an aspect ratio greater than 1.5 and configured sufficiently small to match a laser mode field geometry of the pump light to allow the inner cladding to optically deliver the pump light to the core at a high pump power density, the inner cladding having a cross-sectional area approximately 2 to 25 times larger than the core area to allow a sufficiently high overlap between dopants in the core and the pump light, such that the high pump power density and the high overlap between dopants and the pump light provide the required level of inversion for amplification with a low power threshold and high efficiency; and an outer cladding disposed adjacent to the inner cladding having an index of refraction less than the inner cladding for confining the pump light.

* * * * *